United States Patent [19]
Inaba et al.

[11] 3,909,839
[45] Sept. 30, 1975

[54] PHASE LOCKING SYSTEM FOR TELEVISION SIGNALS USING DIGITAL MEMORY TECHNIQUES

[75] Inventors: Masao Inaba; Kazuo Kashigi; Satoshi Makara; Harunobu Nakamura, all of Tokyo, Japan

[73] Assignee: Nippon Electric Company Limited, Tokyo, Japan

[22] Filed: Apr. 19, 1973

[21] Appl. No.: 352,656

[30] Foreign Application Priority Data

Apr. 24, 1972 Japan .............................. 47-41491

[52] U.S. Cl. ...................................... 358/8; 360/36
[51] Int. Cl.[2] ...................... H04N 9/00; H04N 5/76
[58] Field of Search .......................... 358/8, 13, 31; 178/69.5 DC, DIG. 3; 360/9, 32, 33, 36, 39

[56] References Cited

UNITED STATES PATENTS

| | | | |
|---|---|---|---|
| 3,666,880 | 5/1972 | Krause | 358/8 |
| 3,795,763 | 3/1974 | Golding et al. | 178/DIG. 3 |

FOREIGN PATENTS OR APPLICATIONS

| | | | |
|---|---|---|---|
| 45-16179 | 6/1970 | Japan | 178/69.5 DC |
| 45-25007 | 8/1970 | Japan | 178/69.5 DC |
| 46-217 | 1/1971 | Japan | 178/DIG. 3 |
| 45-27413 | 9/1970 | Japan | 360/36 |

OTHER PUBLICATIONS

Bell Laboratories Record, Vol. 48, No. 4, Apr., 1970, pp. 116–121, "Better Pictures Through Better Coding," E. F. Brown.

*Primary Examiner*—Robert L. Griffin
*Assistant Examiner*—George G. Stellar
*Attorney, Agent, or Firm*—John M. Calimafde

[57] ABSTRACT

An electronic system phase locks one or more input television signals to a signal of reference frequency and phase. The incoming signal is sampled at a first clock rate and phase, pulse code modulated, and stored in memory. The stored video information is then read out from memory under control of a second and independent clock which corresponds in its essential timing aspects to the reference signal.

10 Claims, 3 Drawing Figures

PHASE LOCKING SYSTEM FOR TELEVISION SIGNALS USING DIGITAL MEMORY TECHNIQUES

DISCLOSURE OF THE INVENTION

Figure 1A:
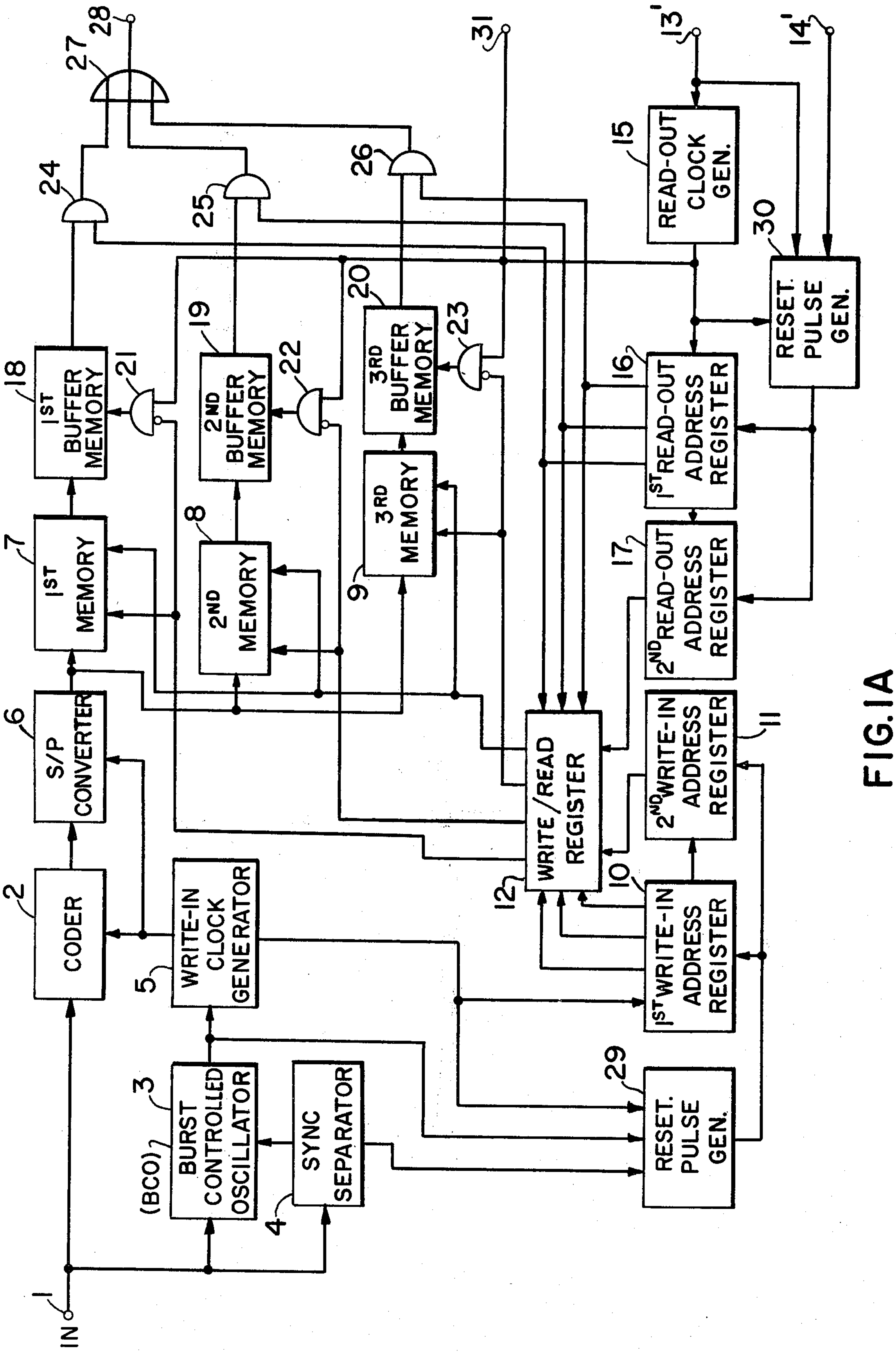

This invention relates to a phase lock system for television signals and, more particularly, to such a phase locking system capable of phase locking a composite video signal differing in phase and frequency from a reference signal.

In a video tape recorder (hereinafter abbreviated to VTR), the reproduced composite video signal always exhibits a slight fluctuation in timing caused by fluctuations in the rotation of the rotary head, or in the speed of the tape transport. To assure the quality of the reproduced video signal, the timing fluctuation must be eliminated. One of the conventional methods employed for this purpose is time-base correction disclosed in U.S. Pat. No. 3,504,111, in which a variable delay line network is used for controlling the phase of the reproduced composite video signal. The delay time of the variable delay line network is controlled employing a variable capacitance diode. With this type of the delay line network, the practical variable range is from 0.3 to 3.0 microseconds. It has therefore been extremely difficult to design or manufacture a variable delay line capable of a delay time of the order of one horizontal scanning period of a TV signal (63.5 microseconds in the case of the NTSC system; hereinafter referred to as 1 H).

As is well known, a television signal is characterized by a very high correlation between respective 1 H video signal components. This enables a variable delay line of only 1 H range to handle a delay of more than 1 H, e.g. 2 H, 3 H, and thereby to achieve the phase synchronization between the reproduced composite video signal and the reference signal.

On the other hand, in a conventional multi-station TV broadcasting system, composite video signals are transmitted from local stations to a center station where the respective video signals are phase-compared with the composite video signal of the center station to provide respective phase difference signals. These phase difference signals are fed back to the respective local stations, e.g., through ordinary telephone lines to compensate for the phase differences of the signals from the local stations.

However, in such a conventional multi-station system, readjustment of the delay time compensation is needed when any one of the transmission lines is switched from one to another.

It is, therefore, an object of this invention to provide an improved phase locking system for television signals, in which the input composite video signal is phase-locked to a reference signal regardless of the amount of phase differences between the two.

It is another object of this invention to provide an improved phase locking system for television signals operative even where a large phase difference obtains.

It is still another object of this invention to provide a multi-station TV broadcasting system capable of maintaining the optimized phase difference compensation, and which is not affected by a possible switch-over of the transmission lines between the local stations and the center station.

According to this invention, there is provided an improved phase locking system for television signals in which the input composite video signal is sampled and coded into a digitalized TV signal by the use of a clock pulse wave, which is produced from the horizontal synchronizing signal and/or the color burst signal contained in the video signal. The encoded signal is stored in a random access memory at an address designated with reference to the clock pulse train. For read-out purposes, another clock pulse train is produced from a reference synchronizing signal and/or a reference color sub-carrier to designate the address.

Figure 1B:
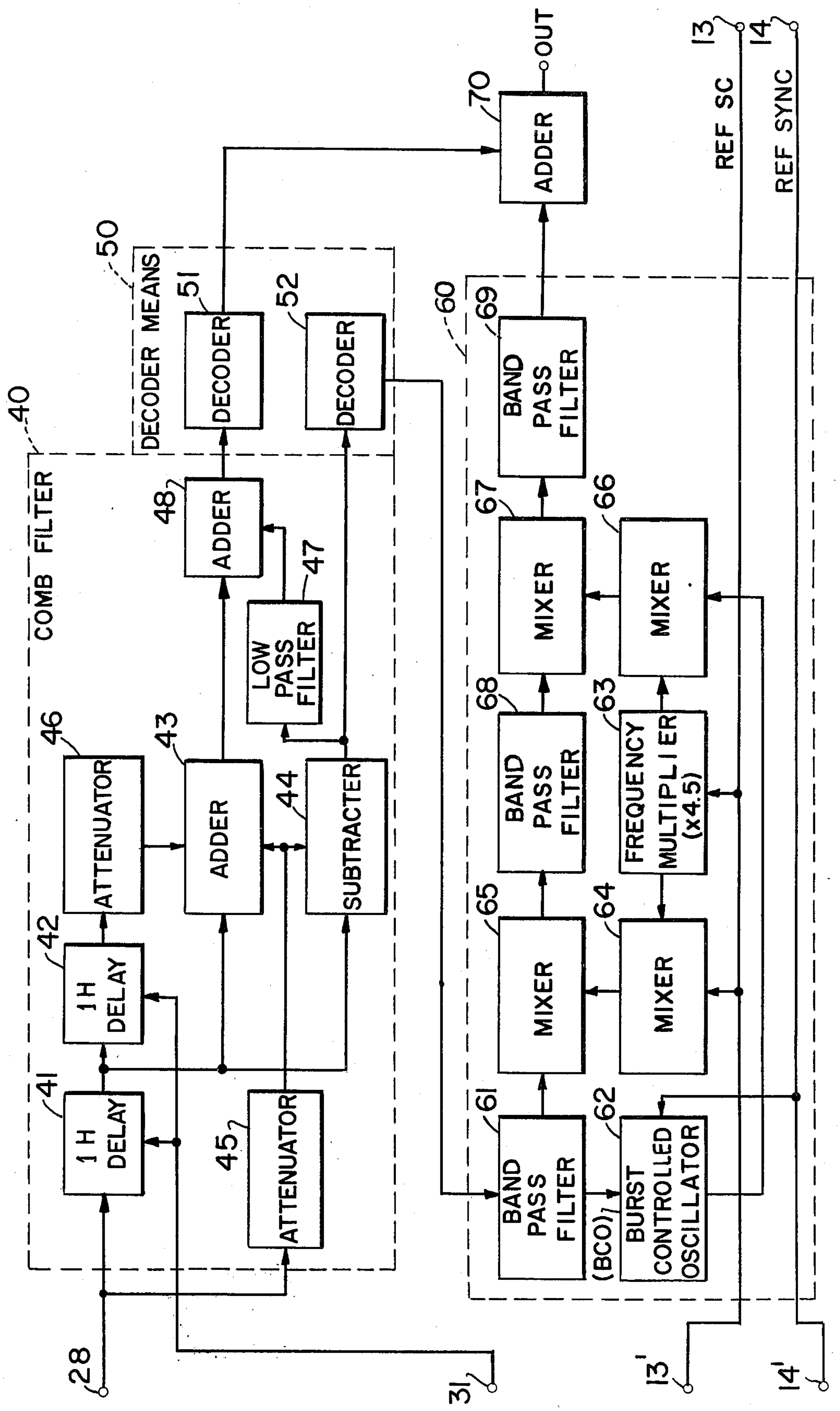
Figure 2:
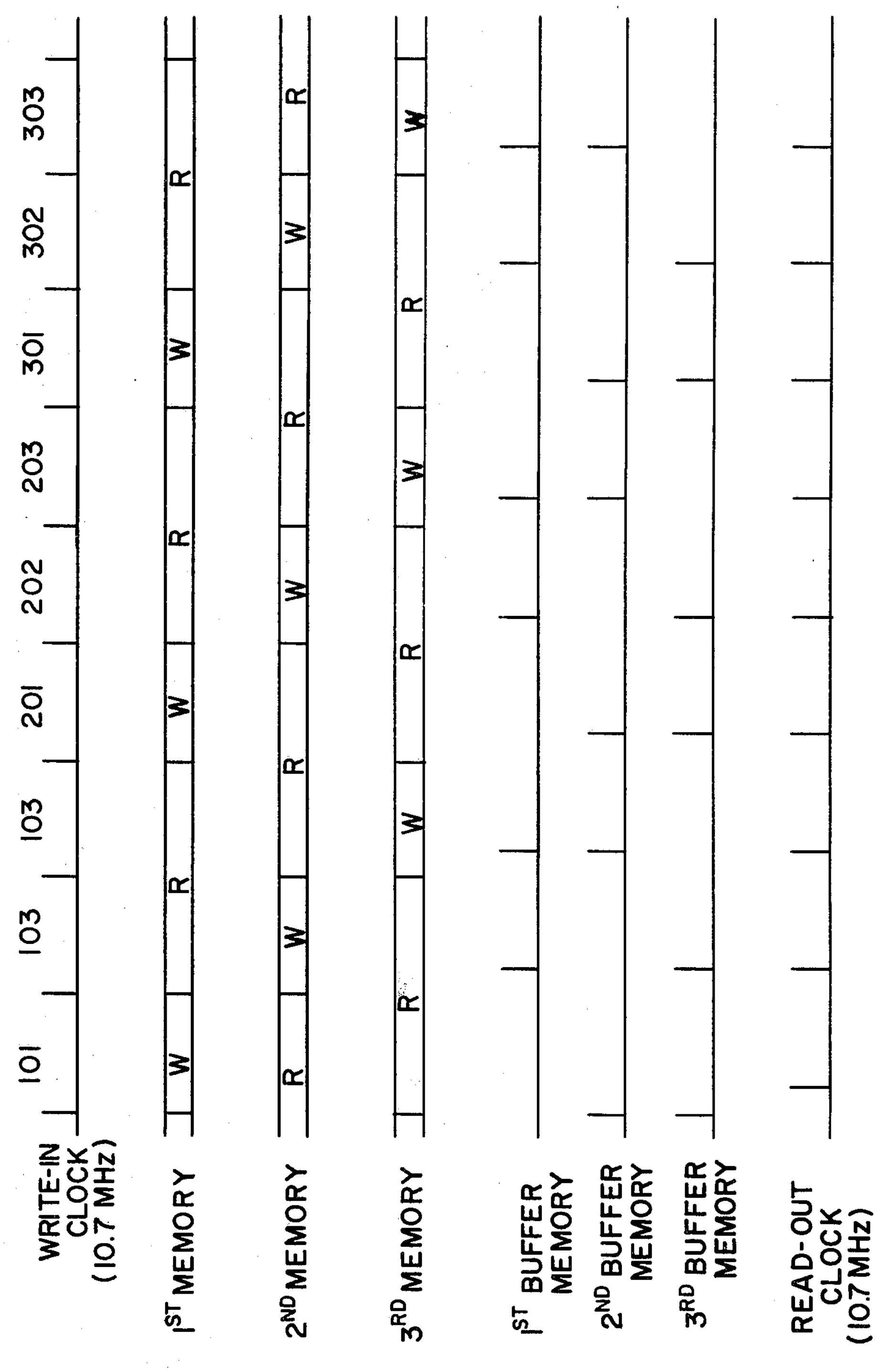

The features and advantages of this invention will be understood from the following detailed description of a preferred embodiment of this invention taken in conjunction with the accompanying drawings, wherein:

FIGS. 1A and 1B are block diagrams of a specific, illustrative embodiment of this invention; and FIG. 2 is a timing chart descriptive of the operation of the embodiment shown in FIGS. 1A and 1B.

Referring to FIG. 1A, the phase locking system embodiment there illustrated is supplied at an input terminal 1 with an input composite video signal from a VTR or a local station. Through the terminal 1, the video signal is supplied to a coder 2, a burst controlled oscillator (BCO) 3 and a sync separator 4. The BCO 3 is also suppled with a synchronizing signal separated at the sync separator 4. The BCO 3 generates a continuous wave of the color subcarrier frequency (3.58 MHz in the case of the NTSC system) synchronized with the color burst signal contained in the input composite video signal.

The sub-carrier from the BCO 3 is supplied to a clock pulse generator 5 to produce a write-in clock pulse rate of about 10.7 MHz (3.58 MHz × 3). The clock pulse is supplied to the coder 2, in which the input video signal is sampled and coded to produce an 8-bit pulse-code-modulated TV signal having a clock frequency of 10.7 MHz. The coder 2 may be of the feed-back type described in an article "A feed-back type coder for CTV" (Paper No. 1581 of the Proceedings of the National Convention of the Institute of Electronics and Communication Engineers of Japan in 1971).

The time serial 8-bit PCM TV signal from the coder 2 is then supplied to a serial-parallel converter 6 for providing a time-parallel code signal. The parallel code signal is then stored in first, second and third memories 7, 8 and 9 in the manner discussed below.

The write-in clock pulse of 10.7 MHz is also supplied to a first write-in address register 10 which drives a second write-in address register 11. The write-in address register 10 and 11 are connected via a write/read switch 12 to the memories 7, 8 and 9 so that the time-parallel digits of the encoded video signal may be stored in the memories 7, 8 and 9 at the clock pulse rate in the order of 7,8,9,7,8 . . . . The registers 10 and 11 are self-cleared when all addresses are filled up.

The write/read switch 12 controlls the write-in and read-out of the memories 7, 8 and 9 with timing shown in FIG. 2. In one clock interval 101, the memory 7 is in a write-in state, while the other memories 8 and 9 are in a read-out state. In the following clock interval 102, the memory 8 in the write-in state while the other memories 7 and 9 function in the read-out mode. Similarly, in the following clock interval 103, the memory 9 is in the write-in state with the others 7 and 8 are in the read-out state.

A reference sub-carrier incoming at an REF SC terminal 13 (FIG. 1B) is supplied via a terminal 13' to a read-out clock pulse generator 15 to produce a read-out pulse rate of 10.7 MHz. The clock pulse is supplied to a first read-out address register 16 which drives a second read-out address register 17. The address registers 16 and 17 are identical in construction to the address registers 10 and 11, respectively. The address data is supplied through the write/read switch 12 to the memories 7, 8 and 9. Therefore, the output coded video signal of the designated address is obtained at the outputs of the respective memories.

As shown in FIG. 2, the output coded video signals from the memories are the writing signal when the memories are in the write-in state. This permits the desired output signal to be provided only when the memories are in the read-out state. Furthermore, the write-in clock pulse and the read-out clock pulse are different in frequency and/or phase. Therefore, it is impossible to read out the output signal when the memory is in the write-in state. To read-out the desired digitalized signal, buffer memories 18, 19 and 20 are coupled to the memories 7, 8 and 9, respectively, and INHIBIT gates 21, 22 and 23 are provided. The INHIBIT gate 21 does not permit the buffer memory 18 from transferring the output of the memory 7 to an AND gate 24 when the memory 7 is in the write-in state, as shown in FIG. 2. Likewise, the INHIBIT gates 22 and 23 prohibit the buffer memories 19 and 20 from transferring the output of the memories 8 and 9 to AND gates 25 and 26 when these are in the write-in state, respectively.

The coded video signals applied to the AND gates 24, 25 and 26 are AND-gated with the gate pulses from the read-out address register 16, which indicate the order of the read-out. The output of the these AND gates are applied to an OR gate 27. Thus, the 8-bit encoded video signal of the clock frequency 10.7 MHz synchronized with the reference signal is obtained at a terminal 28.

The embodiment of FIG. 1A includes a write-in resetting pulse generator 29 and a read-out resetting pulse generator 30 which generate reset pulses upon the receipt of the sub-carrier, the synchronizing signals and the clock pulses. When the memories have a capacity of 1 H (1 H memory), the generators 29 and 30 provide as the resetting pulse a first clock pulse in the first cycle of the sub-carrier immediately following the horizontal synchronizing pulse. In the case of 1 frame memory which has retention for a period of 1 frame, the first clock pulse in the first cycle of the sub carrier as counted from the frame synchronizing signal provided by gating a first serration of the vertical synchronizing signal and a square wave having a pulse width of 50% of the horizontal scanning period and synchronized with the horizontal synchronizing signal is employed. The resetting pulses reset the address registers to their initial condition, whereby the output TV signal is phase-locked to the reference signal.

The total memory capacity of the memories 7, 8 and 9 depends upon how the system of this invention is used. Assuming that the clock frequency is set at 10.7 MHz to permit a PCM resolution of 8 bits/sample, the memory capacity in each case should be as follows:

1. For the use of this invention in a VTR:

Because of the reference signal used for the servo system, the average frequency of the reproduced video signal remains substantially equal to that of the reference signal although there might be some phase fluctuation. Therefore, a memory of 1 H capacity is sufficient. Since the number of the sub-carrier cycles included in the 1 H period is 455/2, the number of the clock pulses for 1 H is $$455/2 \times 3 = 682.5$$

Therefore, the number of the words becomes approximately 683 and that of the bits for the same period is 5464 (8 × 683);

2. For the use of the present system in a multi-station broadcasting system:

In this case, the memory capacity of one frame is required. Because 1 frame contains 525 H's, the number of clock pulses included in one frame is:

$$455/2 \times 3 \times 525 = 358,312.5$$

Therefore, the number of words included in the 1-frame period is 358,313, while the number of bits is 2,866,504.

It is noted for this case that the memory capacity can be reduced by setting in advance a preset phase relationship between two broadcast stations.

The use of the digital memory for storage of the video signals in this invention is different from that for the ordinary computer memory. In the latter, the write-in clock pulse is synchronized with the read-out clock pulse. Usually one clock pulse serves both functions. By way of contrast, in the system of this invention the input video signal is not synchronized with the reference signal. In other words clock pulses for write-in and read-out are not synchronization with each other. Therefore, in the system of the present invention, three different memories are employed to which the input video signal is supplied at the clock repetition rate. For each one of the memories, write-in is performed for one period of the write-in clock pulse, and read-out for two periods of the write-in clock pulse, so that when one of the memories is in the write-in state, the others are in the read-out state, as shown in FIG. 2.

By decoding the output coded video signal from the terminal 28, the video signal, synchronized with the reference signal, is obtained.

In the NTSC and PAL systems, the phase relationship between the horizontal synchronizing signal and the colour subcarrier is not determined. Therefore, when the input signal is switched to another signal (for example, a first camera signal to a second camera signal), the phases of the horizontal synchronizing signals contained in the output video signals are shifted by one half of one cycle period of the color sub-carrier (about 140 nanoseconds) at maximum, whereby the reproduced picture appearing on the picture tube is shifted in lateral direction at the time of switching.

Furthermore, in a multi-station system, the average frequency of the synchronizing signal contained in the input video signal is different from that in the reference signal. Therefore, the memory content tends to be read out duplicatively, i.e., before it has been once read out and replaced by new data of a following frame. In the NTSC system, the phase of the synchronizing signal is 180° out of phase with respect to the color sub-carrier at every other 1 H period. Therefore, the horizontal synchronizing signal is phase-shifted by an amount of one half of one cycle period of the color sub-carrier (about 140 nanoseconds) every time such duplicative read-out is caused.

The rate of occurrence of such undesired duplicative reading is proportional to the frequency difference between the synchronizing signals contained in the input and the reference signals, and inversely proportional to the memory capacity. Assuming that the frequency difference with respect to the sub-carrier frequency 3.58 MHz is 3 Hz and the memory capacity is one frame, the rate of occurrence is about once every 11.1 hours. This rate of occurrence is negligible as a practical matter.

On the other hand, to avoid the above-mentioned visible shift of the reproduced scanning lines in the reproduced picture on the picture tube, the luminance and the chrominance signals are separated from the output signal, with the sub-carrier contained in the carrier chrominance signal replaced with the new sub-carrier, and with the luminance and the chrominance signals superimposed. Alternatively, the coded video signal is decoded to provide the video signal under the NTSC or PAL system, and then converted to Y, I and Q signals or R, G and B signals, thereby to permit these signals to be reconstructed to the NTSC or PAL video signal.

Referring to FIG. 1B showing an example adapted to the first mentioned method of avoiding the phase displacement, a comb filter 40 is provided for separating the luminance and the carrier chrominance signal components from the coded video signal supplied from the terminal 28. Both the separated components are applied to decoder means 50. A subcarrier phase controller 60 is provided for replacing the sub-carrier contained in the input video signal by a reference subcarrier. The output of the decoder means 50 and the sub-carrier phase controller 60, i.e., the decoded luminance signal and the phase-controlled carrier chrominance signal, are added at an adder 70 to provide an output composite video signal.

Stated more specifically, the coded video signal applied at the terminal 28 is supplied to serially connected 1 H delay means 41 and 42. Each of these delay means 41 and 42 may comprise eight registers arranged in parallel. Alternatively, a memory device capable of a retention extending at least to a 5464-bit interval may be employed. In the latter case, the read-out clock pulse can be used both for the write-in and the read-out.

The 1H delayed output of the delay means 41 is supplied to an adder 43 and a subtracter 44. The coded video signal at the terminal 28 is applied also to an attenuater 45 to provide an output of an amplitude of one half of the input thereto, and then to the adder 43 and the subtracter 44. The 2 H delayed output of the delay means 42 is applied to an attenuater 46 to undergo the same attenuation and then to the adder 43 and the subtracter 44. A luminance signal component is obtained at the output of the sutracter 43, and a carrier chrominance signal component at the output of the adder 44. The low frequency component of the carrier chrominance signal component obtained through a low pass filter 47 is added to the luminance signal component at an adder 48 to compensate for the fluctuation in vertical contour.

The method of separating the luminance/chrominance signals (Y/C separation) by the use of the digital comb filter 40 is similar in principle to the well-known analogue Y/C separation technique.

To achieve the 50% attenuation effect on the amplitude component as performed at the attenuaters 45 and 46, the least significant digit of the 8-bit coded video signal is removed, to thereby produce a 7-bit signal. Because the sampling frequency is three times as high as the subcarrier frequency, the number of samples in 1 H is 682.5. Therefore, the sampling point is displaced by one half of the pitch between the adjacent lines, that is, between the input and the output signals of the 1 H delay means 41 or 42. To solve this problem, the sampling point is displaced by one half of the pitch at the rate of 1 H. Alternatively the number of the sampling is set equal to an interger, 456/2 × 3, for example.

The luminance and the carrier chrominance signal components provided at the digital comb filter 40 are supplied to decoders 51 and 52 in the decoder means 50, respectively, to provide analog luminance and carrier chrominance signals. The analog carrier chrominance signal output of the decoder 52 is supplied to the subcarrier phase controller 60 to replace the subcarrier by the reference subcarrier.

For replacement of the subcarrier, the phase controlling techniques for a VTR may be used. Such techniques are as follows: (1) A Decoder/Encoder system in which the NTSC signal is converted to Y,I and Q signals or R,G and B signals, and then reconstructed to the NTSC signal; (2) an electronic resolver system as destribed in the U.S. Pat. No. 3,342,931; and (3) a double heterodyne system as shown in FIG. 1B.

Referring to FIG. 1B, the carrier chrominance signal is supplied to a band pass filter 61 tuned to the subcarrier frequency. The output signal of $f_c+\Delta f$ ($\Delta f$ represents the phase difference to the reference sub-carrier by the frequency) is supplied to a burst controlled oscillator (BCO) 62 to produce a continuous wave synchronized with the burst signal.

The reference subcarrier ($fc$) at the terminal 13 is supplied to a frequency multiplier 63 to produce a signal of 4.5$fc$, which is supplied to a mixer 64, where it is mixed with the reference subcarrier to produce a signal of 5.5$fc$. The signal of 5.5$fc$ from the mixer 64 is mixed with the output signal of the band pass filter 61 of $f_c+\Delta f$ at a mixer 65 to produce a signal of 6.5$fc+\Delta f$. The output signal of the frequency multiplier 63 of 4.5$fc$ is mixed with the continuous wave ($fc+\Delta f$) supplied form the BCO 62 at a mixer 66, to produce a signal of 5.5$fc+\Delta f$, which is supplied to a mixer 67 for mixing with the signal of 6.5$fc+\Delta f$ passed through a band pass filter 68 to produce a signal of $fc$. The output carrier chrominance signal from the mixer 67 is supplied through a band pass filter 69 to the adder 70 and superimposed on the luminance signal to produce the output composite video signal.

In the above example, the BCO 62 is employed for providing a continuous wave synchronized with the burst signal. However, instead of emplying the BCO 62; the memory capacity may be increased by one bit. This will permit the subcarrier obtained form the input composite video signal to be written in with the increased bit as a pilot signal of the subcarrier contained in the PCM TV signal. The additional stored bit is then read-out by the read clock pulse. The read out signal represents the subcarrier of the decoded composite video signal, and may be used in place of the continuous wave of the BCO 62.

What is claimed is:

1. A phase locking system for a composite video signal, comprising:

means for producing a first clock pulse wave having a predetermined phase relationship with said composite video signal;

means for sampling and quantizing said composite video signal in timed relationship with said first clock pulse wave;

a plurality of memory means for successively storing the output of said sampling and quantizing means in response to said first clock pulse wave, with at least one of said memory means being in a write-in state, and with others of said memory means being in an idle state suitable for information read-out;

a plurality of buffer memories connected intermediate said respective memory means and said decoding means, and plural means for inhibiting said buffer memories from transferring output signals from said memory means while its respective memory means is in said write-in state;

a source of a reference signal not synchronized with the incoming composite video signal;

means for producing a second clock pulse wave having a predetermined phase relationship with said reference signal; and means for reading out the stored signal from said memory means disposed in said idle state in timed relationship with said second clock pulse wave through said buffer memories.

2. A combination as in claim 1 wherein said memory means includes means with capacity for storing quantized samples for one hoizontal line of said composite video signal.

3. A combination as in claim 1 wherein said memory means includes means with capacity for storing quantized samples for one field of said quantized video signal.

4. A combination in claim 1, further comprising comb filter means disposed intermediate said read-out means and said decoding means.

5. A combination as in claim 4 wherein said read out signal includes a subcarrier, further comprising subcarrier phase controller means connected to said decoding means and said reference signal source.

6. A combination as in claim 1 further comprising addressing means for allotting the quantized information from said sampling and quantizing means among said plural memories, and wherein said reading out means includes further addressing means for selectively interrogating said plural memories.

7. A combination as in claim 6 further comprising means responsive to said composite video signal for periodically resetting the state of said addressing means to a predetermined initial condition.

8. A combination as in claim 7 further comprising means responsive to said reference signal for periodically resetting the state of said further addressing means to a predetermined initial condition.

9. A phase locking system for a composite video signal, comprising:

means for producing a first clock pulse wave having a predetermined phase relationship with said composite video signal;

means for sampling and quantizing said composite video signal in timed relationship with said first clock pulse wave;

means for storing the output of said sampling and quantizing means;

a source of a reference signal;

means for producing a second clock pulse wave having a preset phase relationship with said reference signal;

means for reading out the stored signal in timed relationship with said second clock pulse wave;

means for decoding the read out signal to produce said composite video signal wherein said read out signal includes luminance and carrier chrominance, and subcarrier signal components further comprising means for separating luminance and carrier chrominance signal components from said read out coded signal, said luminance and carrier chrominance signal components being supplied to said decoding means to produce analog luminance and carrier chrominance signals, respectively, and means for replacing the subcarrier contained in said analog carrier chrominance signal by the reference subcarrier.

10. A phase locking system as claimed in claim 9, wherein said separating means is a digital comb filter.

* * * * *

UNITED STATES PATENT OFFICE

CERTIFICATE OF CORRECTION

Patent No. 3,909,839 Dated September 30, 1975

Inventor(s) Masao Inaba; Kazuo Kashigi; Satoshi Makara; Harunobu Nakamura

It is certified that error appears in the above-identified patent and that said Letters Patent are hereby corrected as shown below:

Claim 1, column 7, between lines 9 and 10, the following should be inserted:

--means for decoding the read out signal to produce a composite video signal,--

Signed and Sealed this

*ninth* Day of *December 1975*

[SEAL]

*Attest:*

RUTH C. MASON
*Attesting Officer*

C. MARSHALL DANN
*Commissioner of Patents and Trademarks*